March 5, 1935.  P. O. HASS  1,993,214
THICKENER FOR PULP STOCK OR THE LIKE
Filed Nov. 21, 1932
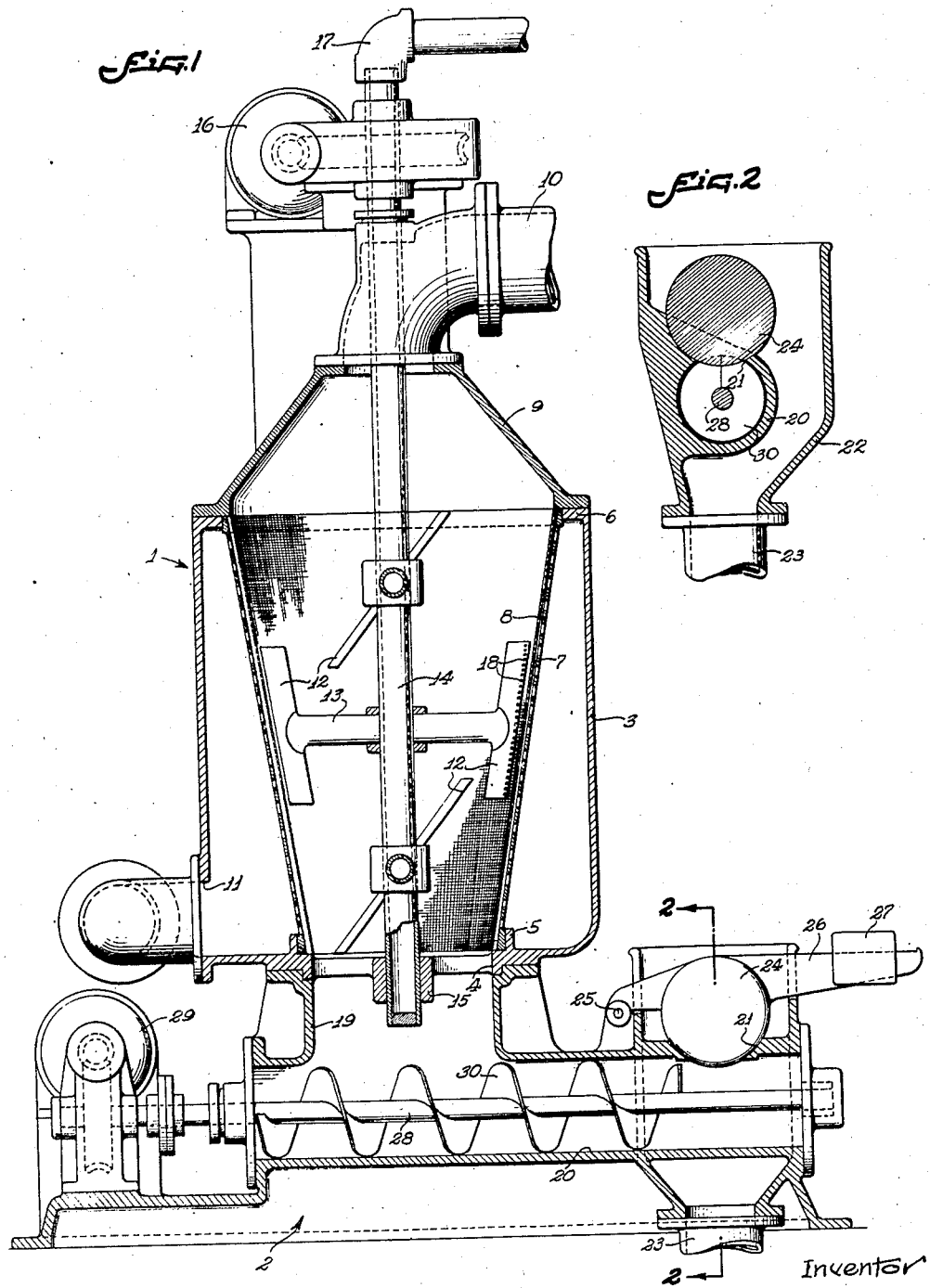
Inventor
Paul O. Hass
By Chindall, Parker + Carlson
Attorneys Patented Mar. 5, 1935

1,993,214

UNITED STATES PATENT OFFICE 1,993,214

THICKENER FOR PULP STOCK OR THE LIKE

Paul O. Hass, Beloit, Wis.

Application November 21, 1932, Serial No. 643,633

16 Claims. (Cl. 92—34)

The invention relates to apparatus for thickening a mixture of pulp or other comminuted material and a liquid, such as water, which has been added thereto for purposes of cleaning, separating or other treatment.

An object of the invention is to provide a thickening apparatus of novel and improved construction resulting in an apparatus of large capacity.

Another object is to provide a thickening apparatus having adjustable means detecting the thickness or consistency of the mixture in the apparatus and controlling the discharge thereof to insure a stock of uniform consistency.

More particularly stated it is an object to provide, in a thickening apparatus, an adjustable discharge control means adapted to be actuated by a mixture of a predetermined consistency to permit a discharge thereof.

Yet another object is to construct a thickening apparatus with novel means for cleaning and flushing the filtering element.

Other objects and advantages will become apparent from the following detailed description taken in connection with the accompanying drawing in which Figure 1 is a substantially diametrical sectional view of an apparatus embodying the features of the invention.

Fig. 2 is a vertical sectional view taken approximately along line 2—2 of Fig. 1.

An apparatus constructed in the manner of this invention comprises, in general, means for separating the pulp or other comminuted solids from the great bulk of water and means for detecting the consistency of the thickened mixture and operating to control the discharge thereof from the apparatus so as to obtain a stock of uniform consistency. Structurally, the apparatus shown in the drawing by way of illustration consists, in the main, of an upright casing 1 forming a chamber housing the means for separating the solids from the water and a base 2 supporting the casing and providing a passage for the discharge of thickened mixture in conjunction with which passage the means for detecting the consistency of the mixture and for controlling the discharge thereof operates.

In the apparatus here shown, separation of the solids from the water is effected by filtration. The casing 1 in which the filtration takes place has a substantially cylindrical body portion 3 formed with an opening 4 in the bottom bounded by a circular upturned flange 5, and an inturned flange 6 at the upper end forming an opening somewhat larger than the opening 4. Positioned in the casing with its ends fitting within the flanges 5 and 6 respectively, is an inverted frusto-conical grid 7 perforated to permit the passage of water therethrough. Within the grid 7 is placed a filter element 8 of wire cloth or the like of a mesh fine enough to prevent the passage therethrough of the pulp or other comminuted material which is to be separated from the water.

The casing is completed by a conically shaped cover 9 which carries at its apex an elbow 10 forming the inlet for the thin mixture of pulp and water which is usually supplied under pressure. The water passing through the filter is discharged through an outlet 11 in the side wall of the casing near the bottom thereof, while the solids which are arrested by the filter pass downwardly through the opening 4 into the passage in the base 1 as will appear presently.

Means is provided for agitating the mixture within the filter and for scraping and urging toward the opening 4 in the bottom of the casing the solids which accumulate on the filter element 8 as the water runs off. Herein this means is in the form of elongated paddles 12, six being here employed, supported with their faces at right angles to the filter element 8 at the opposite ends of hollow cross-arms 13 mounted on a shaft 14 extending axially of the filter. The paddles 12 have their major dimension extending generally in the direction of the axis of the filter and are tilted so that the longitudinal edge lies closely adjacent the filter element 8 throughout the length of the paddle. The arms 13 are positioned at right angles to one another and are adjustable axially of the shaft 14 so that the paddles 12 may be positioned to lie closely adjacent to but not in actual contact with the filter element 8 thereby to avoid any injury thereto by the paddles. The paddles are of such length that they overlap and that they clean the filter element over its entire length.

The shaft 14 is rotatably mounted and is journaled at its lower end in a bearing 15 centrally of the opening 4. At its upper end, the shaft 14 projects through the elbow 10 and is geared to drive means 16 of any desired character capable of rotating the shaft. In order that the solids, which are scraped from the filter element 8 as the shaft 14 is rotated, may be urged downwardly and through the opening 4, the paddles 12 are inclined so that the top edge leads the bottom edge. The solids which accumulate on the filter element 8 are thus constantly urged toward the opening 4 in the bottom of the casing and the filter element cleaned to facilitate the filtering process.

To aid in the filtering process by removing the layer of solids not removed by the paddles 12 and to flush the filter element thoroughly and conveniently, the agitating means is adapted to direct a spray of water against the filter element 8. To that end, the shaft 14, as well as the cross-arms 13 and the paddles 12, are hollow and intercommunicate. At its extreme upper end, the shaft 14 has a connection 17 with a source of water, not shown, and the water is discharged in the form of spray from a series of perforations 18 in the paddles. In order that the spray may impinge the filter element 8 at an angle and thus be more effective to clean the same, the perforations 18 are formed in the face of the paddles, here shown as the leading face, at the edge adjacent the filter element 8.

The passage in the base 2, into which the solids accumulating on the filter element 8 are urged by the paddles 12, has an upwardly opening throat portion 19 of the size of the opening 4 in the bottom of the casing and a cylindrical, horizontally disposed portion 20. The throat 19 is near one end of the horizontal portion 20 while at the other end is an opening 21 through which the thickened-mixture is discharged. The opening 21 is formed in the upper side of the horizontal passage 20 and permits the thickened-mixture to overflow into a chute 22 from which it flows by gravity to a stock outlet pipe 23.

The discharge of thickened-mixture is controlled automatically to obtain a stock of uniform consistency and herein such control is effected by means whose operation is dependent upon the thickness of the mixture and which is actuated directly by the thickened-mixture to be discharged. In the present instance, this means comprises a pressure-actuated valve incorporating the opening 21 and a power driven device located in the passage in the base 2 and operable to convey the thickened-mixture from the throat end to the discharge end of the passage and to build up a pressure at the discharge end which is directly proportional to the thickness of the mixture.

The pressure-actuated valve has a spherical member 24 hingedly connected to the base at 25 and adapted to seat in the opening 21 so that it may be actuated by the pressure of the thickened-mixture within the passage in the base. The member 24 is by its own weight biased to closed position and in addition has projecting therefrom an arm 26 carrying a weight 27 movable along the arm. By means of the weight 27, the valve is adjustable to be overbalanced by any desired pressure which pressure thus determines the thickness of the mixture which will open the valve as will presently be shown.

In the present instance, the power driven device is a rotary, non-positive conveyor and comprises a shaft 28 driven by a motor 29 and carrying blades which are inclined so as to urge the thickened-mixture entering the throat of the passage toward the opening 21 when the shaft 28 is rotated. Preferably, the blades take the form of a helical fin 30 of a diameter substantially that of the cylindrical portion 20 of the passage and extending from the throat end of the passage to the opening 21 therein. In its rotation, the screw conveyor so formed by the fin 30 carries, from the throat 19 into the cylindrical portion 20, the mixture constantly thickened by the addition of solids pushed down by the paddles 12 while the thinner mixture is thereby forced to follow the sinuous path afforded by the fin 30 and escape back into the throat and eventually up into the filter chamber. As this process continues, the mixture in the passage becomes thicker and the conveyor, which originally was ineffective to build up a sufficient pressure in the passage to open the outlet valve because the thin mixture too easily escaped back along the fin, gradually becomes more effective as the mixture becomes less fluid. As the effectiveness of the fin 30 to convey the mixture thus increases, a pressure is built at the discharge end of the passage which is proportional to the thickness of the mixture. Thus, when the mixture becomes of a certain thickness, the pressure built up within the passage acting on the member 24 will overbalance the weight thereof and the weight 26 and cause the valve to open and permit a discharge of the thickened-mixture.

The operation of the thickener is thus believed easily understood. Initially the thin mixture introduced through the elbow 10 fills the passage in the base 1 as well as the filtering element 8. At such time, the rotating fin 30 idly and ineffectively churns the mixture in the passage. However, as solids, extracted from the water passing through the filtering element 8 and discharged through the outlet 11, accumulate on the element 8 and are forced into the passage by the paddles 12, the thin mixture in the throat 19 is displaced and forced upwardly into the filtering chamber. The somewhat thicker mixture in the throat 19 is conveyed by the rotating fin into the cylindrical portion 20 where it again displaces the thin mixture which is forced back as previously described into the throat and eventually into the filter chamber. This displacement of the thin mixture by a mixture gradually becoming thicker continues until the fin 30 is effective to build up the pressure required to open the valve controlling the opening 21. The thickened mixture is thus discharged onto the stock outlet 23, such discharge continuing as long as the required pressure is maintained.

It will thus be seen that a single control means has been provided which is actuated directly by the thickened-mixture to be discharged and which accurately controls the consistency of the mixture discharged.

I claim as my invention:

1. An apparatus for thickening pulp or the like in liquid suspension comprising, in combination, a base having a horizontally disposed cylindrical passage terminating at one end in a thickened-mixture discharge opening and at the other end in an upwardly opening throat, a casing supported on said base having a thin-mixture inlet at the top and a clear water outlet near the bottom, an open-ended conically-shaped grid interposed in the casing between the thin-mixture inlet and the water outlet, said casing having an opening in the bottom permitting communication between the interior of the grid and the passage in said base, a conically shaped filter within said grid, agitating means for scraping the pulp from the filter and urging the same downwardly into the passage in said base, a screw positioned in said passage and adapted to convey the thickened-mixture to the discharge opening, and a valve controlling the discharge opening and adapted to be opened by the pressure of the mixture when it becomes of a predetermined consistency.

2. An apparatus for thickening a mixture of pulp or the like and water comprising, in combination, a base having a passage therein, a casing supported on said base and having a thin mixture inlet and a water outlet, a filter element interposed between the inlet and outlet, said casing having an opening affording communication between the inlet side of said filter and said base, a normally closed valve actuated by pressure within said base to control the discharge of thickened-mixture from said base, a power driven device operative to create increasing pressure within said base as the mixture thickens, and means urging toward said device the solids accumulating on said filter element.

3. An apparatus for thickening a mixture of pulp or the like and water comprising, in combination, a casing having a thin mixture inlet and a clear water outlet, filtering means within said casing, a base supporting said casing and having a cylindrical passage communicating near one end with said casing to receive the thickened-mixture from said filtering means, a valve biased to closed position controlling the discharge end of said passage, and a rotary conveyor in said passage having a helical fin of a diameter substantially that of the passage operative to displace the thin mixture in the passage with the thickened-mixture received from said filtering means.

4. An apparatus for thickening a mixture of pulp or the like and water comprising, in combination, a casing having a thin-mixture inlet and a clear water outlet, filtering means within said casing, means forming a passage for the discharge of thickened-mixture from said filtering means, a valve adapted to be opened by pressure within the passage controlling the discharge of thickened-mixture from said passage, and a screw conveyor located in said passage and operating when the mixture is of a predetermined consistency to build up a pressure sufficient to open said valve.

5. In an apparatus of the character described, means for thickening the thin mixture of liquid and solids in suspension, means providing a passage adapted to receive the thickened mixture at one end, a valve normally closing the other end of said passage but adapted to open automatically upon the building up of a predetermined pressure within said passage, and a rotary device in said passage operable in its rotation to urge the thickened-mixture toward the valve end of said passage and permit the escape of the thin-mixture back to the means for thickening the mixture.

6. In an apparatus of the character described, means providing a discharge passage, a valve normally closing one end of said passage but adapted to open automatically upon the building up of a predetermined pressure within said passage, means discharging thickened-mixture into said passage at the other end, and a power driven device operable to convey the thickened-mixture to the valve end of said passage and thereby displace the thin-mixture until the mixture becomes of a consistency at which the device builds up in the passage the pressure necessary to open said valve.

7. An apparatus for thickening pulp stock or the like comprising, in combination, a casing having a thin-mixture inlet and a clear water outlet, filtering means within said casing, means forming a passage for the discharge of thickened-mixture from said filtering means, and means, including a valve controlling the passage biased to closed position and opening by pressure from within, operating to effect a discharge of thickened-mixture of a predetermined consistency.

8. An apparatus of the character described comprising, in combination, a casing having a thin-mixture inlet and a liquid outlet, filtering means within said casing for thickening the mixture, and means controlling the discharge of thickened-mixture from the apparatus to permit a discharge only when the mixture becomes of a predetermined consistency.

9. An apparatus of the character described comprising, in combination, a casing having a thin-mixture inlet at the top and a liquid outlet in the side wall near the bottom, a filter element interposed in said casing between the inlet and the liquid outlet, said casing having an opening providing communication with the inlet side of said filter element, agitating means within said casing scraping the thickened-mixture from said filter element and urging the same toward the opening in said casing, and means controlling the consistency of the thickened-mixture discharged from the apparatus.

10. An apparatus for thickening a material in liquid suspension comprising, in combination, a base having a discharge passage, a casing supported on said base and having a thin-mixture inlet, a liquid outlet and an opening for the passage of thickened material into the discharge passage, a filter element interposed between the inlet and the liquid outlet, and means within said casing adapted to mechanically scrape the thickened material from said filter element and simultaneously to flush the same.

11. An apparatus of the character described comprising, in combination, a base having a passage therein, a casing supported on said base having a thin-mixture inlet at the top and a clear water outlet near the bottom, an upright, conically-shaped filter interposed in said casing between the inlet and the clear water outlet, said inlet communicating with the interior of said filter, said casing having an opening affording communication between the interior of said filter and the passage in said base, and means for scraping the thickened-mixture from said filter comprising an element mounted to revolve about an axis concentrically of said filter and tilted to urge the thickened-mixture downwardly toward the opening communicating with the passage in said base.

12. An apparatus for thickening pulp stock or the like comprising, in combination, a base having a passage therein, a casing supported on said base having a thin-mixture inlet at the top and a clear water outlet near the bottom, an upright conically-shaped filter interposed in said casing between the inlet and the clear water outlet, said inlet communicating with the interior of said filter, said casing having an opening affording communication between the interior of said filter and the passage in said base, and means for scraping the thickened-mixture from said filter comprising a hollow, rotatably mounted shaft extending axially of said filter and adapted to be connected with a water supply and hollow scraping blade carried by the shaft and communicating with the interior thereof, said blade having perforations in one face thereof through which water is impinged against said filter.

13. An apparatus of the character described comprising, in combination, an elongated filter element of circular cross-section open at opposite ends, a casing enclosing said element providing inlet and outlet openings at opposite ends and having an outlet externally of said element, and a member extending alongside of the inner surface of said filter element and acting to mechanically scrape the accumulating material therefrom and to direct jets of washing liquid toward the element.

14. An apparatus of the character described comprising, in combination, an elongated filter element of circular cross-section disposed within said casing and open at opposite ends, a casing enclosing said element providing inlet and outlet openings at opposite ends and having an outlet externally of said element, a mechanical scraping member movable around the inner surface of said filter element and means located adjacent the active portion of said member and operable to direct a spray of washing liquid toward the element.

15. An apparatus of the character described having, in combination, a casing having inlet and two outlet openings, a filter element within said casing between said inlet and one of said outlets and defining a chamber communicating with said inlet and the other outlet, means providing a passage having an inlet communicating with said last mentioned outlet and an outlet remote from the passage inlet, means responsive to the thickness of the mixture within said passage for discharging the mixture from the passage outlet when a certain consistency has been obtained.

16. An apparatus of the character described having, in combination, a casing having inlet and two outlet openings, a filter element within said casing between said inlet and one of said outlets and defining a chamber communicating with said inlet and the other outlet, means providing a passage having an inlet communicating with said last mentioned outlet and an outlet remote from the passage inlet, means operating in said passage to build up a pressure near the outlet thereof proportional to the thickness of the mixture in the passage, and means responsive to the attainment of a certain pressure to release the mixture from the passage outlet.

PAUL O. HASS